Patented Sept. 4, 1934

1,972,093

UNITED STATES PATENT OFFICE

1,972,093

HIGHLY HALOGENATED ANTHRAQUINONE-ACRIDONE COMPOUND AND ITS PRODUCTION

Ivan Gubelmann and Robert J. Goodrich, South Milwaukee, Wis., assignors to E. I. du Pont de Nemours & Company, Wilmington, Del., a corporation of Delaware No Drawing. Application November 16, 1931, Serial No. 575,476

14 Claims. (Cl. 260—37)

This invention relates to polyhalogen-anthraquinone-diacridone. More particularly, this invention relates to vis-a-vis-$\alpha,\alpha$-anthraquinone-diacridones containing more than 4 halogen atoms per molecule. By vis-a-vis-$\alpha,\alpha$-anthraquinone-diacridones we mean the compounds illustrated by the following formulas:

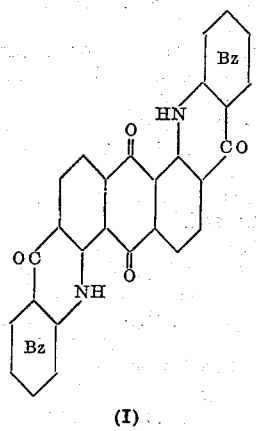

(I)
1,2,5,6-anthraquinone-diacridone;

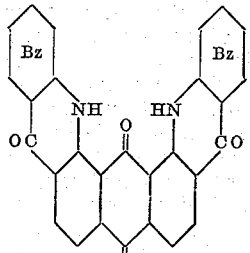

(II)
1,2,8,7-anthraquinone-diacridone.

the term "vis-a-vis" indicating that the heterocyclic rings are joined to the opposite nuclei of the anthraquinone residue (as distinguished from 1,2,4,3-anthraquinone-diacridone), while the letters $\alpha,\alpha$ indicate that the NH groups are attached to $\alpha$-positions of the anthraquinone residue. The letters Bz mark those rings which are not part of the anthraquinone nucleus, and which will hereinafter be referred to as the "Bz" or "benz" rings.

We have found that vis-a-vis-$\alpha$, $\alpha$-anthraquinone-diacridones containing more than 4 atoms of halogen per molecule, more particularly, 5 or 6 atoms of chlorine per molecule possess distinctive characteristics which set them off and distinguish them from the corresponding lower chlorination products, such as the trichloro compounds. These distinguishing characteristics may be observed in the respective solutions of these compounds in concentrated sulfuric acid. Our novel polyhalogen compounds generally give cherry red solutions in $H_2SO_4$, while the lower chlorination derivatives give orange colored solution. Our novel highly halogenated compounds are also less soluble in the hydrosulfite vat than the lower halogenation compounds. But the most important and practically valuable distinction is in the nature of the dyestuffs obtained when the various halogenation products are reacted with amino-anthraquinone compounds to produce anthrimides, and the latter in turn condensed with ring-closing agents such as metallic halides. The compounds thus produced from our novel highly chlorinated vis-a-vis-$\alpha,\alpha$-anthraquinone-diacridones and amino-anthraquinone compounds are generally valuable vat dyestuffs of high tinctorial value, whereas the colors obtainable from the corresponding lower chlorination products exhibit but weak dyeing qualities.

We do not desire to limit our invention to any particular theory or formula, but for the sake of better clearness the following hypothetical explanation is advanced. Apparently, in chlorinating vis-a-vis-$\alpha,\alpha$-anthraquinone-diacridones, the chlorine first enters the Bz rings. But when a total of 4-chlorine atoms have entered the molecule (two to each Bz ring), further chlorination introduces chlorine into the $\alpha$-positions of the anthraquinone residue, para to the NH group of the heterocyclic ring. When these products are now reacted with amino-anthraquinones, the $\alpha$-chlorine atoms are apparently exchanged for the anthraquinonyl-imino residue, in preference to the Bz-chlorine atoms.

It is accordingly an object of this invention to prepare novel highly halogenated vis-a-vis-$\alpha,\alpha$-anthraquinone-diacridone compounds which are useful as intermediates for dyestuffs.

Another object of this invention is to produce halogenated derivatives of vis-a-vis-$\alpha$, $\alpha$-anthraquinone-diacridones, containing chlorine in the anthraquinone nucleus.

Other and further objects of this invention will be readily apparent from the following disclosure.

We prepare our novel highly chlorinated compounds by reacting with chlorine gas upon vis-a-vis-$\alpha$, $\alpha$-anthraquinone-diacridone, or upon its lower halogenation products, dissolved in chloro-sulfonic acid, in the presence of iodine as a catalyst, until the desired amount of chlorine has been absorbed.

Without limiting our invention to any particular procedure, the following examples will serve to illustrate our preferred mode of operation. The parts mentioned are parts by weight.

Example 1

10 parts of anthraquinone 1,2,5,6-diacridone (Formula I) are dissolved in 50 parts of chloro-sulfonic acid at room temperature and stirred until solution is complete. $\frac{1}{10}$ part of iodine is then added and chlorine gas is passed in slowly until a sample withdrawn, diluted, washed and dried shows upon analysis a 32–33% chlorine content. The mass is then poured slowly into a mixture of 300 parts of ice and 300 parts of water, filtered and washed free of acid with cold water; dried and ground. The product obtained constitutes a dark-bluish powder, insoluble in water, dilute sulfuric acid or alcohol; slightly soluble in hot dichloro-benzol or nitrobenzol, imparting thereto a red-violet coloration; and readily soluble in concentrated sulfuric acid with a bright cherry-red color. The product is most probably hexachloro-1,2,5,6-anthraquinone-diacridone; more particularly, BzBz-tetrachloro-4,8-dichloro-1,2,5,6-anthraquinone-diacridone.

If it is desired to produce a pentachloro compound; the procedure is the same as above, but the reaction is suspended as soon as a test sample shows the product to contain about 29% of chlorine by weight.

Example 2

The procedure is the same as in Example 1, except that 10 parts of 1,2,8,7-anthraquinone-diacridone (Formula II) are used as initial material in lieu of the 1,2,5,6-isomer therein specified. (The 1,2,8,7-anthraquinone-diacridone body may be obtained by reacting 1,8-dichloro-anthraquinone with an anthranilic acid salt, for instance, according to the process of British Patent No. 312,678, and then ring closing the intermediate 2',2''-dicarboxy-1,8-dianilido-anthraquinone in known manner, for instance by the aid of concentrated sulfuric acid.) The product obtained is a dark-bluish powder; insoluble in water, alcohol, or dilute sulfuric acid; readily soluble in concentrated sulfuric acid with a bluish-red color; and appreciably soluble in hot ortho-dichloro-benzol or in hot nitrobenzol with a violet color. The product is most probably hexa-chloro-1,2,8,7-anthraquinone-diacridone; or, more particularly, Bz,Bz-tetrachloro-4,5-dichloro-1,2,8,7-anthraquinone-diacridone.

Example 3

10 parts of anthraquinone-1,5-bisanthranilic acid (2',2''-dicarboxy-1,5-dianilino-anthraquinone

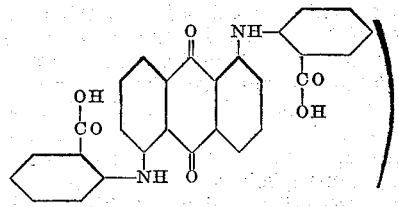

are dissolved in 50 parts of chloro-sulfonic acid and stirred at room temperature for about 2 hours. $\frac{1}{10}$ part of iodine is now added and chlorine gas is slowly passed in until a test sample shows that about 6 atoms of chlorine have been absorbed per mol of the anthraquinone body. The remainder of the procedure is like in Example 1, and the product is the same as in Example 1.

If desired, one may start with a partly halogenated anthraquinone-diacridone and proceed to increase its chlorine content in accordance with our invention. Moreover, one may use a brominated anthraquinone-diacridone as initial material, whereupon the resultant product will contain both chlorine and bromine.

Example 4

20 parts of tribromo-1,2,5,6-anthraquinone-diacridone (obtained for instance by reacting with an excess of bromine upon 1,2,5,6-anthraquinone-diacridone in chloro-sulfonic acid solution in the presence of iodine) are dissolved in 200 parts of chloro-sulfonic acid, and ½ part of iodine is added. Chlorine gas is now passed in slowly for about 20 hours at room temperature. The mass is now diluted with ice water and filtered, and the filter cake is washed with water until free of acid and dried. The product constitutes a dark blue powder; sparingly soluble in nitrobenzol with a purple color; readily soluble in sulfuric acid with a cherry-red color. It analyzes 22.8% Cl and 23.8% Br, which corresponds to a hexa-chloro-tri-bromo compound.

Many other variations and modifications are possible in our invention without departing from the spirit of the same.

It should be further understood that our invention is applicable to vis-a-vis-α,α-anthraquinone-diacridone itself as well as to its simple substitution derivatives such as the lower halogenation derivatives thereof.

We claim:

1. The process of producing a highly halogenated vis-a-vis-α,α-anthraquinone-diacridone, which comprises reacting with chlorine gas upon a vis-a-vis-α,α-anthraquinone-diacridone in chloro-sulfonic acid, in the presence of iodine, and continuing the process until the total halogen content of the product has reached a predetermined amount above 4 atoms per molecule.

2. The process of producing a highly chlorinated vis-a-vis-α,α-anthraquinone-diacridone containing about 6 atoms of halogen per molecule which comprises reacting with chlorine gas upon a vis-a-vis-α,α-anthraquinone-diacridone in chlorosulfonic acid, in the presence of iodine, and continuing the process until the total halogen content has reached 6 atoms per molecule.

3. The process of producing a hexa-chloro-vis-a-vis-α,α-anthraquinone-diacridone, which comprises passing chlorine gas into a solution of vis-a-vis-α,α-anthraquinone-diacridone in chlorosulfonic acid in the presence of iodine, and continuing the process until a test sample shows that about 6 chlorine atoms have been absorbed.

4. The process of producing a hexa-chloro-1,2,5,6-anthraquinone-diacridone which comprises passing chlorine gas into a solution of 1,2,5,6-anthraquinone-diacridone in chloro-sulfonic acid in the presence of iodine, and continuing the process until a test sample shows that about 6 chlorine atoms have been absorbed.

5. The process of producing a hexa-chloro-1,2,8,7-anthraquinone-diacridone which comprises passing chlorine gas into a solution of 1,2,8,7-anthraquinone-diacridone in chloro-sulfonic acid in the presence of iodine, and continuing the process until a test sample shows that about 6 chlorine atoms have been absorbed.

6. A chlorinated anthraquinone-diacridone containing over 4 atoms of total halogen per molecule.

7. A halogenated anthraquinone-diacridone containing halogen in the Bz rings and chlorine in the anthraquinone nucleus.

8. A chlorinated vis-a-vis-$\alpha,\alpha$-anthraquinone-diacridone containing chlorine in the Bz rings as well as in an alpha position of the anthraquinone nucleus.

9. A chlorinated vis-a-vis-$\alpha,\alpha$-anthraquinone-diacridone containing over 4 atoms of chlorine per molecule.

10. A chlorinated 1,2,5,6-anthraquinone-diacridone containing more than 4, but not over 6 atoms of chlorine per molecule.

11. A chlorinated 1,2,8,7-anthraquinone-diacridone containing more than 4, but not over 6 atoms of chlorine per molecule.

12. Hexa-chloro-1,2,5,6-anthraquinone-diacridone.

13. Hexa-chloro-1,2,8,7-anthraquinone-diacridone.

14. The process of producing a highly halogenated vis-a-vis-$\alpha,\alpha$-anthraquinone-diacridone, which comprises reacting upon a solution of a partially halogenated vis-a-vis-$\alpha,\alpha$-anthraquinone-diacridone in chlorosulfonic acid with chlorine gas and continuing the process until the total halogen content of the product has reached a predetermined amount above 4 atoms per molecule.

IVAN GUBELMANN.
ROBERT J. GOODRICH.